US006942846B1

(12) United States Patent
Eckardt et al.

(10) Patent No.: US 6,942,846 B1
(45) Date of Patent: Sep. 13, 2005

(54) RECOMBINATION DEVICE AND METHOD FOR CATALYTICALLY RECOMBINING HYDROGEN AND/OR CARBON MONOXIDE WITH OXYGEN IN A GASEOUS MIXTURE

(75) Inventors: Bernd Eckardt, Bruchköbel (DE); Axel Hill, Stockstadt (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 09/937,668

(22) PCT Filed: Mar. 15, 2000

(86) PCT No.: PCT/DE00/00798

§ 371 (c)(1),
(2), (4) Date: Sep. 28, 2001

(87) PCT Pub. No.: WO00/60608

PCT Pub. Date: Oct. 12, 2000

(30) Foreign Application Priority Data

Mar. 31, 1999 (DE) ................................. 199 14 814

(51) Int. Cl.[7] .......................... C01B 5/00; C01B 31/20; B01J 35/02
(52) U.S. Cl. .................... 423/437.2; 422/177; 422/180; 422/211; 422/222
(58) Field of Search .................... 423/580.1, 437.2; 422/177, 180, 211, 222

(56) References Cited

U.S. PATENT DOCUMENTS

| | | | | |
|---|---|---|---|---|
| 3,930,890 A | * | 1/1976 | Dietz | 136/181 |
| 4,048,113 A | * | 9/1977 | Risse | 252/462 |
| 4,054,419 A | * | 10/1977 | Smith et al. | 423/DIG. 13 |
| 4,078,893 A | | 3/1978 | Gilman et al. | |
| 4,119,706 A | * | 10/1978 | Rogers | 423/580 |
| 4,237,030 A | * | 12/1980 | Noguchi et al. | 252/432 |
| 4,757,045 A | * | 7/1988 | Turner et al. | 502/252 |
| 4,849,399 A | * | 7/1989 | Joy, III et al. | 502/333 |
| 4,992,407 A | | 2/1991 | Chakraborty et al. | |
| 5,035,875 A | * | 7/1991 | Daish | 423/580 |
| 5,110,779 A | * | 5/1992 | Hucul | 502/185 |

(Continued)

FOREIGN PATENT DOCUMENTS

DE 37 25 290 A1 2/1989

(Continued)

OTHER PUBLICATIONS

Buchner et al, "Sammelbände mit Einzeldarstellungen über Forschung und Entwicklung auf Gebieten des chemischen Apparatewesens", DECHEMA Monographien, Elektro-chemische Verfahrenstechnik, vol. 97, 1984, pp. 363-376, no month.

(Continued)

*Primary Examiner*—Wayne A. Langel
(74) *Attorney, Agent, or Firm*—Venable LLP; Robert Kinberg; Marina V. Schneller (57) ABSTRACT

A recombination device (1, 1') for catalytically recombining hydrogen and/or carbon monoxide with oxygen in a gaseous mixture comprises at least one catalyst system (2) in which a housing (4) is mounted through which the gaseous mixture can flow in free convection in the operational phase. According to the invention, said catalyst system (2) is provided with a plurality of sub-areas (T1, T2) in the direction of flow. A first sub-area (T1) comprises in the incoming direction a catalyst body (6) with a surrounding throttle layer (8) for inhibiting the diffusion of the incoming and/or discharged reaction gases. A second sub-area (T2) that adjoins the first sub-area (T1) comprises at least one catalyst body (6) that is directly accessible by the reaction gases.

20 Claims, 3 Drawing Sheets

U.S. PATENT DOCUMENTS

| | | | | |
|---|---|---|---|---|
| 5,167,908 | A * | 12/1992 | Chakraborty | 423/580 |
| 5,175,136 | A * | 12/1992 | Felthouse | 502/242 |
| 5,200,382 | A * | 4/1993 | Cody et al. | 502/204 |
| 5,217,939 | A * | 6/1993 | Campbell | 502/339 |
| 5,250,489 | A * | 10/1993 | Dalla Betta et al. | 502/262 |
| 5,301,217 | A | 4/1994 | Heck et al. | |
| 5,422,331 | A * | 6/1995 | Galligan et al. | 502/333 |
| 5,473,646 | A * | 12/1995 | Heck et al. | 423/580.1 |
| 5,495,511 | A | 2/1996 | Chakraborty | |
| 5,496,788 | A * | 3/1996 | Domesle et al. | 602/333 |
| 5,592,521 | A * | 1/1997 | Hill | 423/580.1 |
| 5,604,174 | A * | 2/1997 | Friedman et al. | 502/439 |
| 5,811,064 | A * | 9/1998 | Kojima et al. | 422/180 |
| 5,958,829 | A * | 9/1999 | Domesle et al. | 502/333 |
| 6,025,297 | A * | 2/2000 | Ogura et al. | 502/300 |
| 6,071,850 | A * | 6/2000 | Friedman et al. | 502/439 |
| 6,107,239 | A * | 8/2000 | Qin et al. | 502/300 |
| 6,165,430 | A * | 12/2000 | Kudla et al. | 423/213.5 |
| 6,297,185 | B1 * | 10/2001 | Thompson et al. | 502/101 |
| 6,356,613 | B1 * | 3/2002 | Eckardt et al. | 423/580.1 |
| 6,420,306 | B2 * | 7/2002 | Kurokawa et al. | 502/261 |
| 6,479,428 | B1 * | 11/2002 | Tonkovich et al. | 502/302 |
| 6,491,877 | B1 * | 12/2002 | Eckardt et al. | 422/174 |

FOREIGN PATENT DOCUMENTS

| | | |
|---|---|---|
| DE | 37 29 114 A1 | 3/1989 |
| DE | 196 36 557 | 3/1998 |
| DE | 196 36 557 A1 | 3/1998 |
| DE | 197 04 608 | 6/1998 |
| DE | 199 14 814 C1 | 12/2000 |
| EP | 0 388 955 A2 | 9/1990 |
| EP | 0 436 942 A2 | 7/1991 |
| EP | 0 527 968 B1 | 2/1993 |
| EP | 0 945 178 A1 | 9/1999 |

OTHER PUBLICATIONS

International Search Report for PCT/DE00/00797 (now WO 00/59634).

U.S. Appl. No. 09/968,586 (corresponding to DE 199 14 823 A1).

US 5,811,054, 09/1998, Kojima et al. (withdrawn)

* cited by examiner

RECOMBINATION DEVICE AND METHOD FOR CATALYTICALLY RECOMBINING HYDROGEN AND/OR CARBON MONOXIDE WITH OXYGEN IN A GASEOUS MIXTURE

BACKGROUND OF THE INVENTION

The invention relates to a recombination device, as well as a method for recombining hydrogen and/or carbon monoxide with oxygen, for which at least one catalyst system is arranged inside a housing through which the gaseous mixture can flow during the operational phase, in particular a nuclear power plant.

The simultaneously filed German Application with File Number 199 14 823.6, entitled "KATALYTISCHES ELEMENT ZUR REKOMBINATION VON WASSERSTOFF UND/ODER KOHLENMONOXID MIT SAUERSTOFF" [Catalytic Element for the Recombination of Hydrogen and/or Carbon Monoxide with Oxygen] deals with a similar topic, the disclosure content of which must be included in this application.

Following an accident with cooling agent loss, large amounts of hydrogen and carbon monoxide can be released into a safety container (containment) of a nuclear power plant. Without counter measures, the hydrogen in the atmosphere of the containment can be enriched to such a degree that an explosive mixture can form. With a later accidental ignition, the integrity of the containment can be endangered, particularly if larger amounts of hydrogen burn up.

Different devices are under discussion for preventing explosive gaseous mixtures of this type inside the containment. These devices include, for example, catalytic recombination devices, catalytically and electrically operated ignition devices or a combination of the two above-mentioned devices. The principal mode of operation of catalytic recombination devices is known, for example, from the field of electrochemical engineering and is explained, e.g. in: "ELEKTROCHEMISCHE VERFAHRENS-TECHNIK" [Electrochemical Engineering], DECHEMA[1] Monographs, 1970–1992, Volume 97, pages 363–376, Meeting of the Expert Team for Applied Electrochemistry), Chanie Publishing House. [1] Note: DECHEMA=German Association for Chemical Equipment An early and flameless recombination of the hydrogen and/or the carbon monoxide with oxygen in particular is the goal to remove the hydrogen and the carbon monoxide from the containment atmosphere. In the process, a significant pressure build-up caused by a virulent hydrogen combustion is to be safely avoided. A suitable, early starting recombination device, which does not essentially decrease in activity even after longer operating times in the containment atmosphere and which starts up passively at low environmental temperatures, is known from German Patent Application DE 196 36 557 A1. A recombination arrangement of this type permits a "soft" recombination of the hydrogen, e.g. during a containment atmosphere phase with steam, which is therefore protected against spontaneous combustion.

A recombination device is disclosed in the EP 0 527 968 B1, which provides for a number of catalyst systems in the form of flat panels that are coated on both sides with a catalyst material such a platinum and/or palladium. This device is particularly suitable for the reduction of hydrogen in the containment atmosphere of a nuclear power plant. Each catalyst system comprises a carrier plate of stainless steel, which is provided on both sides with a thin layer of in particular platinum and/or palladium and has a thickness in the micrometer range. A plurality of such coated individual plates is arranged inside a housing that can be designed as a module. The gaseous flow to be monitored flows from the bottom into the housing and leaves the housing in the upper region through an exit opening on the side.

A recombination system with a protective housing is known from EP 0 436 942 A1, which opens up automatically in dependence on an outer temperature. However, the protective housing is closed in the operating phase of the recombination system, so as to avoid contamination of the catalytically active surface of the recombination device.

A recombination device disclosed in EP 0 416 140 A1, on the other hand, is provided with filtering means for retaining pollutants from the atmosphere, e.g. aerosols, thus protecting the catalyst of the recombination device against contamination.

Precious metal alloys are furthermore known from German Patent Application DE 37 25 290, which absorb or discharge the reaction heat developing during the recombination by means of a carrier plate or a metal mesh to prevent an ignition of the gaseous mixture.

A recombination device is known from EP 0 388 955 A1, which is additionally provided with an ignition device for triggering a controlled hydrogen combustion.

Each known recombination system is designed for a particularly high recombination device capacity with particularly low component dimensions, as well as for high resistance to pollutants. When using a recombination device for recombining hydrogen in a gaseous mixture in a nuclear power plant, it must also be ensured that no influences that negatively effect the safety of the nuclear power plant can occur. It should furthermore be taken into account that the catalyst system of a recombination device used for the recombination of hydrogen generally heats up as a result of the recombination. As a result, it could contribute unintentionally to the ignition of the gaseous mixture inside the containment atmosphere of the nuclear power plant because of its increased temperature.

SUMMARY OF THE INVENTION

Thus, it is the object of the invention to provide a recombination device for the catalytic recombination of hydrogen and/or carbon monoxide with oxygen in a gaseous mixture, in particular in the containment atmosphere of a nuclear power plant. The object furthermore is to safely avoid an undesirable ignition of the gaseous mixture during the operation and to specify a method for the catalytic recombination.

With respect to the device for catalytically recombining hydrogen and/or carbon monoxide with oxygen in a gaseous mixture, said device having at least one catalyst system arranged inside a housing through which the gaseous mixture flows during the operational phase and the catalyst system is divided into several sub regions in flow direction of the gaseous mixture, the aforementioned object is solved according to the invention in that a first sub region in the inflow direction comprises a catalyst body with a surrounding retarding layer for inhibiting the diffusion of the incoming and/or outgoing reaction gases. A second sub region that adjoins the first sub region comprises at least one catalyst body that is directly accessible to the reaction gases, wherein the characteristics of the first and the second sub region in the recombination device are preferably used one after another. Thus, a multi-stage catalytic oxidation is made possible in the catalyst system that comprises several sub regions. The different sub regions are laid out such that the different reaction conditions occurring along the flow direction of the gaseous mixture are taken into account. In particular, the first sub region in the inflow area of the catalyst system will have a particularly ignition-inhibiting design with respect to the highly explosive gaseous mixture flowing into this region. In contrast, a particularly high catalytic activity is in the foreground for the sub regions in the upper flow region since the gaseous mixture has already been partially purified. Consequently, the reaction gas concentration is already clearly below the concentration that leads to ignition, e.g. a H2 concentration above 8% by volume. Alternatively, different types of sub regions can also be arranged alternating along the gaseous mixture flow direction.

A catalyst body in the second sub region is preferably selected, which has a higher catalytic activity than the catalyst body in the first sub region. For example, this can be achieved by selecting a catalyst with a higher density of activity centers, meaning a higher share of catalytically active material. As a result, a stronger catalytic activity and thus an increased catalytic reaction is achieved in the respective sub region. Depending on the strength of the catalytic activity, the second sub region can additionally be encased by a flame-arresting device. The flame-arresting device in this case is mounted with a gap width of no more than 0.7 mm, preferably less than 0.3 mm. A particularly good heat transfer from the second reaction zone of the second sub region to the first reaction zone of the first sub region and thus a quick start of the catalytic reaction in the first reaction zone is achieved by installing the flame-arresting device directly over the second sub region and additionally extending the flame-arresting device to the first sub region that is particularly diffusion-inhibiting.

The catalyst body can consist of several individual parts, e.g. compressed or sintered fibers. The catalyst body in the second sub region advantageously comprises a carrier plate coated with a catalytic material. The carrier plate is made, for example, from a non-rusting stainless steel and has a thickness of less than or equal to 0.2 mm. The catalyst body alternatively can comprise a flat panel, a perforated panel or a sphere as mechanical carrier. Depending on the type and function of the catalytic recombination, the mechanical carrier can be made of metal or ceramic, wherein the ceramic embodiment, for example, can consist of a wash coat ($Al_2O_3$).

For a particularly effective recombination of the hydrogen in the gaseous mixture, the catalyst material contains a catalytic precious metal, in particular platinum or palladium. Platinum in this case is particularly temperature-resistant and resistant to catalyst poisons. In addition to hydrogen, carbon monoxide can also be recombined with platinum as catalytically active material. Palladium is particularly suitable because it has the characteristic of a particularly low environmental light-off temperature. Thus, a precious metal is preferably selected for the first sub region, which is more resistant to poisons than the precious metal used in the second sub region. The catalyst material is preferably deposited with the aid of a bonding layer and/or an intermediate layer onto the mechanical carrier.

The retarding layer for an especially advantageous embodiment, in particular designed to be porous, consists of a bulk material in the first sub region containing the catalyst body. A partial flow of the gaseous mixture therefore flows through the catalyst body (flow-through alternative) that is arranged in the bulk material. The catalyst body of the second sub region in this case is arranged separate from the catalyst body of the first sub region. For example, the two catalyst bodies are arranged one after another in flow direction of the gaseous mixture. The porosity of the bulk material is dimensioned such that if a particularly explosive gas mixture is present in the inflow region, with $H_2$ concentrations higher than 10% by volume, the $H_2$ concentration is reduced in the outflow region of the first sub region to less than 6% by volume. In order to compensate for the pressure losses inside the flow-through housing, the inflow area can be increased to 2 to 5 times the size. With a housing height of 0.2 to 2 m, a flow-through speed of 0.1 to 1 m/s is preferably achieved for the gaseous mixture in the region of the catalyst system.

The retarding layer in the first sub region of another advantageous embodiment is deposited on the catalyst body as a porous cover layer. With this catalyst system, called a flow-around alternative, the catalyst body in the first and second sub region is formed by a continuous body, meaning this body extends over the first as well as the second sub region. Thus, the complete flow of gaseous mixture flows around the catalyst body. The retarding layer deposited in the first sub region makes it possible in the inflow region to inhibit the diffusion of the reaction gases flowing in and/or out. As a result, the catalytic recombination of the reaction gases is limited, which in turn leads to a limiting of the reaction temperature, even with high $H_2$ concentrations. The speed of the gaseous mixture flowing over or around the catalyst, which also influences the catalytic reaction, is advantageously influenced by a predetermined housing geometry. The overflow speed of the gaseous mixture preferably is adjusted to 0.1 to 2 m/s in the region of the catalyst system if the housing height is 0.2 to 2 m.

Several identical catalyst systems are advantageously arranged parallel to each other for a particularly high reaction conversion. For the alternative where the gas flows around, for example, adjacent catalyst systems are arranged parallel to each other with the respectively associated first and second sub regions. In that case, each catalyst system is provided in the first sub region with an associated retarding layer. With the flow-through alternative for the catalyst systems, for example, several identical first sub regions are arranged parallel to each other and are surrounded by a joint retarding layer. The associated second sub regions are separated from the first sub regions and are also arranged parallel to each other. As an alternative, different types of catalyst systems can be arranged alternating. An especially secure and active catalytic recombination in several stages is achieved when using a combination of catalyst systems with a first, a second or several sub regions, wherein a non-retarded reaction occurs in particular in one sub region and a diffusion-retarded reaction in another sub region. As a result of this multi-stage recombination, a particularly secure protection against ignition or flaming with simultaneously high reaction conversion is achieved, even with less explosive gaseous mixtures for the individual sub regions or flow channels.

The catalyst systems advantageously have a plate-shaped design, with a respective maximum total thickness of 1 cm, preferably approximately 0.3 mm, and are spaced apart at a distance of less than 20 mm.

In order to ensure a homogeneous recombination, particularly a multi-stage oxidation, even with so-called up-currents of the gaseous mixture flowing in with particularly high speeds, an up-current protection is installed in front of the catalyst system in the inflow direction. The up-current protection can already comprise a portion of the catalyst body. In particular, the cross-sectional surface area of the recombination device is advantageously increased by 1 to 5 times in the inflow area. As a result, a particularly simple flow restriction of the incoming gaseous mixture is achieved which, in turn, effects a continuous feeding of the gaseous mixture, thereby securely avoiding a displacement of the reaction zone. The housing height preferably ranges from 0.2 to 2 m in order to reduce and, if necessary, compensate the pressure losses inside the housing.

To achieve a particularly secure operation during a possible change in flow direction inside the recombination device, resulting from so-called down currents, a down curent protection is arranged at the end of the catalyst system in outflow direction of the gaseous mixture. With particularly extreme flow conditions for alternating flow directions, a partial reaction surface covering can be provided in the outflow region, which causes a surface increase in the same way as the up-current protection.

According to another advantageous embodiment, a teflon coating is provided on the retarding layer, at least in the inflow region of the first sub region. The capacity for an early start, particularly in humid environmental conditions, can lead to the generating of local hydrophobic properties of the catalyst body owing to such a locally limited teflon coating. As a result of the quantitative limitation of the teflon coating, a reaction-relevant adsorption of water within the pore layer or the retarding layer can be avoided and an improvement achieved in the early-start capacity (passive reaction start).

The object to be achieved with the method for catalytically recombining hydrogen and/or carbon monoxide with oxygen in a gaseous mixture is solved according to the invention in that the gaseous mixture for starting the recombination reaction is supplied to a catalyst body, wherein only a partial amount of the gaseous mixture as seen in flow direction comes into contact with the catalyst body in a first sub region and wherein the catalyst body is completely subjected to the gaseous mixture only in a second sub region. In particular, the recombination is realized in a first sub region in flow direction, on a catalyst body surrounded by a retarding layer and is realized in a second sub region on a catalyst body that is directly accessible to the gaseous mixture. The two sub regions—first and second sub region—preferably make it possible to have zones with different catalytic activity. In turn, this results in a multi-stage catalytic oxidation of the reaction gases.

The gaseous mixture for the flow-through alternative is advantageously guided in the first sub region through the retarding layer, wherein a partial flow of the non-purified gaseous mixture flows through the first sub region where it is purified. This purified gaseous mixture is subsequently mixed with non-purified gaseous mixture in a mixing zone, positioned downstream of the catalyst body, thereby reducing the concentration of explosive reaction gases, in particular the $H_2$ concentration. This mixed, low concentration gaseous mixture is then supplied for further catalytic oxidation to the second sub region, which is not covered by a retarding layer. In the second sub region of the catalyst body, the gaseous mixture consequently has direct access to the catalyst body, which comprises in particular catalytically highly active material. As a result, a higher catalytic conversion occurs in the second sub region, which can be increased further by a catalyst material with higher catalytic activity.

For the alternative where the gaseous mixture flows around the catalyst system, the complete gaseous mixture is guided preferably in the first sub region along the retarding layer. In the process, the hydrogen is decomposed along the catalyst system, meaning along the first and second sub region.

The hydrogen content of the gaseous mixture that must be taken into account, even for the most unfavorable ("worst case") operation is reduced in the first sub region through oxidation to less than 5% by volume. Thus, the gaseous mixture flowing into the second sub region has a concentration level below the ignition concentration of the respective reaction gas. As a result, the diffusion-inhibiting and flame-stopping retarding layer can be omitted in the second sub region, even with highly active catalyst material.

The reaction temperature is preferably lower in the first sub region than in the second sub region. In particular, the reaction temperature in the first sub region is below the ignition temperature of the reaction gases. The reaction temperature in the first sub region is preferably less than 560° C. even in the "worst case" and is thus below the ignition temperature for hydrogen. In the second sub region, as a result of the reduction in temperature that occurred in the first sub region, a catalytic material with higher catalytic activity is used than in the first sub region.

The advantages achieved with the invention are an especially secure and particularly active catalytic recombination for highly explosive gaseous mixtures (high $H_2$ concentration up to 15%), in particular without ignition, as well as for less explosive gaseous mixtures (low $H_2$ concentration of approximately 1% by volume) as a result of at least two different sub regions for the catalyst system.

BRIEF DESCRIPTION OF THE DRAWINGS

Exemplary embodiments of the invention are explained in further detail with the aid of a drawing.

DETAILED DESCRIPTION OF THE PREFERRED EMBODIMENTS

The same reference numbers are used for matching components in the different Figures.

Figure 1:
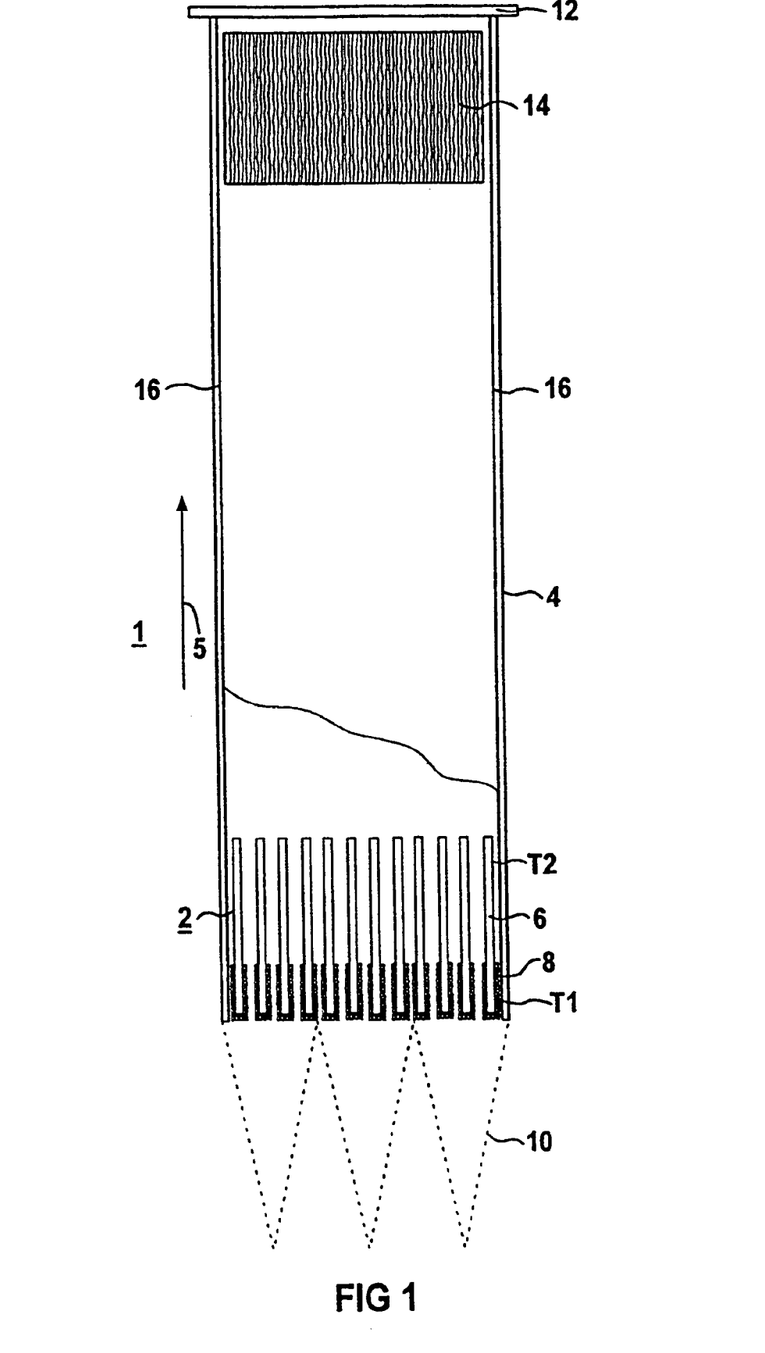
FIG. 1 shows a recombination device for catalytically recombining hydrogen and/or carbon monoxide with oxygen in a gaseous mixture with the aid of a catalyst system.
Figure 4:
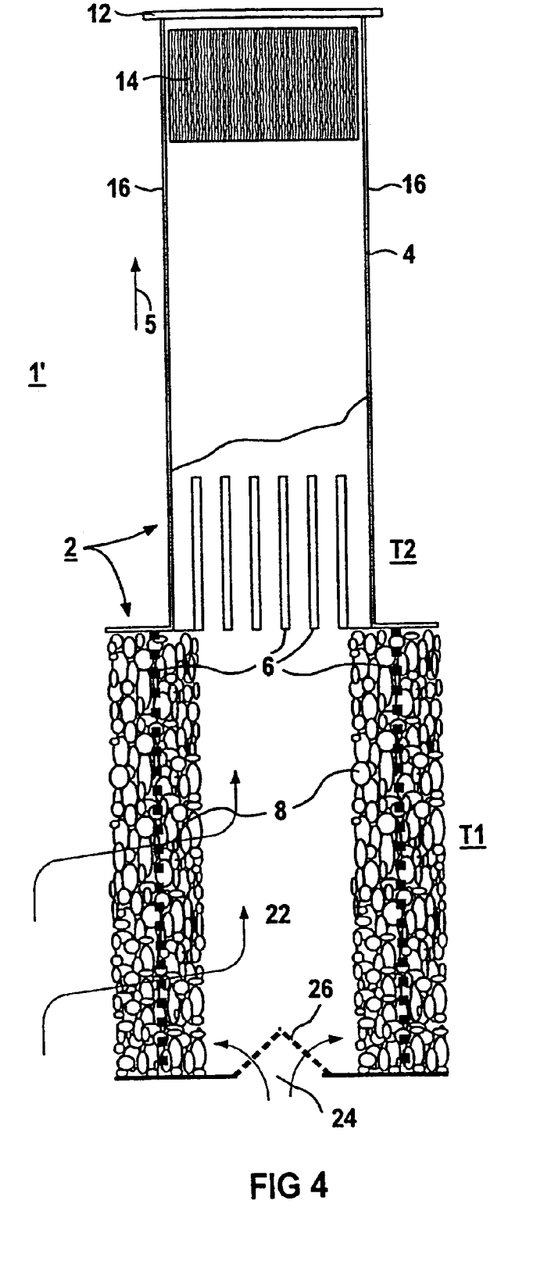
FIG. 4 shows an alternative recombination device for catalytically recombining hydrogen and/or carbon monoxide with oxygen, in a gaseous mixture with a catalyst system.

The recombination device 1 according to FIG. 1 and the recombination device 1' according to FIG. 4 are each provided for the catalytic recombination of hydrogen and/or carbon monoxide with oxygen in a gaseous mixture, namely in the containment atmosphere of a nuclear power plant that is not shown in further detail herein, in the event of an accident.

The recombination device 1 comprises a multitude of catalyst systems 2, which are arranged nearly parallel and at a maximum distance of 20 mm relative to each other. Depending on the type and function of the recombination device 1, a single catalyst system 2 can also be provided. In addition, it is possible to provide several identical or different catalyst systems 2.

The catalyst systems 2 are positioned inside a housing 4. The housing 4 is designed such that during the operational phase, the gaseous mixture can flow in a free convection through the recombination device 1, 1'. For this, the housing 4 essentially forms a vertical shaft, with the preferred direction indicated by the arrow 5. The up-current resulting from the heat development during the recombination of the gaseous mixture in the region of the catalyst system 2 causes an overcompensation of the pressure drop for the gaseous mixture during the operation of the recombination device 1, 1'. Thus, the gaseous mixture begins to flow through the recombination device 1, 1' without outside help or driving means as a result of a chimney effect, resulting from the shaft-type design of housing 4. The shaft-type portion of housing 4 has a height of between 0.2 and 2 m for compensating the resulting pressure losses. For a particularly favorable convection behavior, the housing 4 additionally has an advantageous height-to-depth ratio of between 0.3 and 10.

The recombination device 1, 1' is designed such that even with the high temperatures occurring as a result of the heat release during the recombination of hydrogen in the region of the catalyst systems 2, an ignition of the ignitable gaseous mixture is securely avoided in the region outside of the recombination device 1, 1'. For this, each catalyst system 2 is provided with at least two sub regions, as seen in flow direction of the gaseous mixture, meaning a first sub region T1 and a second sub region T2. Depending on the type and function of the recombination device 1, 1', more than two sub regions can also be provided.

For the catalytic recombination, each catalyst system 2 comprises a catalyst body 6 in the first sub region T1 as well as in the second sub region T2, which contains a catalytically active material that is suitable for the recombination. The catalytically active material provided in particular can be a precious metal, a mixture of precious metals or even an arrangement of precious metal foils. Platinum and/or palladium in particular are provided as precious metals.

To avoid igniting a highly explosive gaseous mixture, particularly in the inflow region, the catalyst body 6 in the first sub region T1 is surrounded by a retarding layer 8 for inhibiting the diffusion of the reaction gases flowing in and/or out. In the second sub region T2, the reaction gases have immediate access to the catalyst body 6. In the process, the gaseous mixture is guided in the first sub region T1 along the retarding layer 8 and in the second sub region T2 along the catalyst body 6.

The catalytic recombination in the first sub region T1, as seen in flow direction of the gaseous mixture, is inhibited because of the retarding layer 8 that surrounds the catalyst body 6. That is to say, the inflow of the reaction gases, e.g. $CO$, $H_2$, $O_2$, $CO_2$, is preferably inhibited in the first sub region T1, so that only a partial oxidation takes place. In turn, a slowing down of the catalytic recombination occurs, which keeps the reaction temperature low and in particular below 560° C. The length of the sub region T1 is primarily determined by the concentration of the incoming reaction gas. In particular, the hydrogen content of the gaseous mixture in the first sub region T1 is reduced through catalytic oxidation to less than 5% by volume.

Thus, a gaseous mixture with a reaction gas concentration below the ignition concentration flows into the following catalytic zone, meaning into the second sub region T2. As a result, the gaseous mixture has direct access to the catalyst body 6 in the second sub region T2. The second sub region T2 is catalytically more active in this case than the sub region T1, in that the catalyst body 6 in the second sub region T2 contains a catalytically more active material. The reaction temperature in the second sub region T2 consequently is higher than 560° C. As shown, the two sub regions—first sub region T1 and second sub region T2—represent zones with different catalytical activity, as explained, thus permitting a multi-stage catalytic oxidation of the reaction gases. Depending on the strength of the catalytic activity, the second sub region T2 can additionally be surrounded by a non-depicted flame-blocking device.

In order to ensure a homogeneous recombination, especially a multi-stage oxidation, even with so-called up-currents of the gaseous mixture flowing in with particularly high speeds, an up-current protection 10 is installed in the direction from which the gaseous mixture flows into the catalyst system 2. The up-current protection 10 results in a particularly advantageous increase of 1 to 5 times of the cross-sectional surface at the intake for the recombination device 1.

For a particularly secure operation with a possible reversal in flow direction inside the recombination device 1, 1' as a result of the so-called down currents, a down current protection 12 is provided at the upper end of the housing 4, in outflow direction of the gaseous mixture. The down current protection 12 simultaneously serves as a housing roof and thus as a drop-rejecting limitation for the recombination device 1, 1'. Thus, a direct inflow of liquid drops into the recombination device 1, 1' is avoided, even during the operation of a spray system above the recombination device 1, 1'.

In flow direction of the gaseous mixture, the recombination device 1, 1' additionally comprises a filter 14 below the down current protection 12. This filter 14, which is installed behind the catalyst systems 2 inside the housing 4, functions to filter out rough particles. For example, the filter 14 is made of a mesh of thin wires. The mesh has a mesh width that is selected to be particularly small, preferably smaller than 800 $\mu m$, taking into account the pressure losses inside the recombination device 1, 1' and the required deposition capacity. A further design criteria taken into account for dimensioning the mesh width is that catalyst poisons, such as aerosols or colloids, should not be separated out at the filter 14. Rather, the filter 14 is dimensioned in such a way that aerosols or colloids can penetrate quantitatively and without losses worth mentioning as a result of depositing. The danger of a blocked filter due to aerosol or colloid deposits is thus securely avoided.

The housing 4 is additionally provided with an insulating shell 16. The insulating shell 16, for example, can be realized with an air gap in the manner of a double-shell design. Alternatively, a temperature-resistant and radiation-resistant insulating material can be provided between two shell layers. Radiation is thus securely prevented from exiting through the insulating shell 16. In particular, the heat transport that is relevant in a temperature range above 500° C. is stopped to a high degree by the design of insulating shell 16. The ignition of the gaseous mixture surrounding the housing 4 (containment atmosphere) as a result of the high housing temperature is thus securely avoided.

Figure 2:
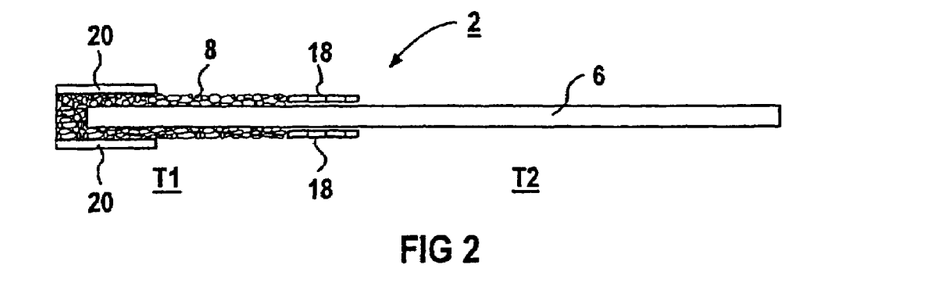
FIG. 2 shows a sectional detail of the catalyst system 2 from FIG. 1.

FIG. 2 shows a catalyst system 2 according to FIG. 1, comprising a catalyst body 6. The catalyst system 2 has a panel-shaped design with a total thickness of at most 1 cm, in particular for a ceramic embodiment. The total thickness preferably amounts to approximately 0.3 mm. The first sub region T1 comprises the retarding layer 8 that surrounds the catalyst body 6. The retarding layer 8 in this case is designed as porous cover layer, which is deposited on the catalyst body 6. The porosity of the retarding layer 8 causes a bonding of the incoming reaction gases and thus a limiting of the catalytic reaction to small partial amounts per surface unit in the first sub region T1. The second sub region T2 additionally is enriched with an especially active catalytic material, for example deposited as a layer 18 on the catalyst body 6. The locally limited enrichment of the catalytically active material supports the starting function of the catalyst system 2. The layer 18 in particular contains platinum or palladium. Alternatively, the catalytically active material can also be arranged in the surface of the catalyst body 6.

In accordance with another advantageous embodiment, a teflon coating 20 is provided on the retarding layer 8, at least in the inflow region of the first sub region T1, which coating only slightly hinders the inflow of reaction gases. As a result of the local limitation of the teflon coating 20, a reaction-relevant adsorption of water within the porous or retarding layer 8 can be avoided and the capacity for an early start can be improved (passive reaction start).

Figure 3:
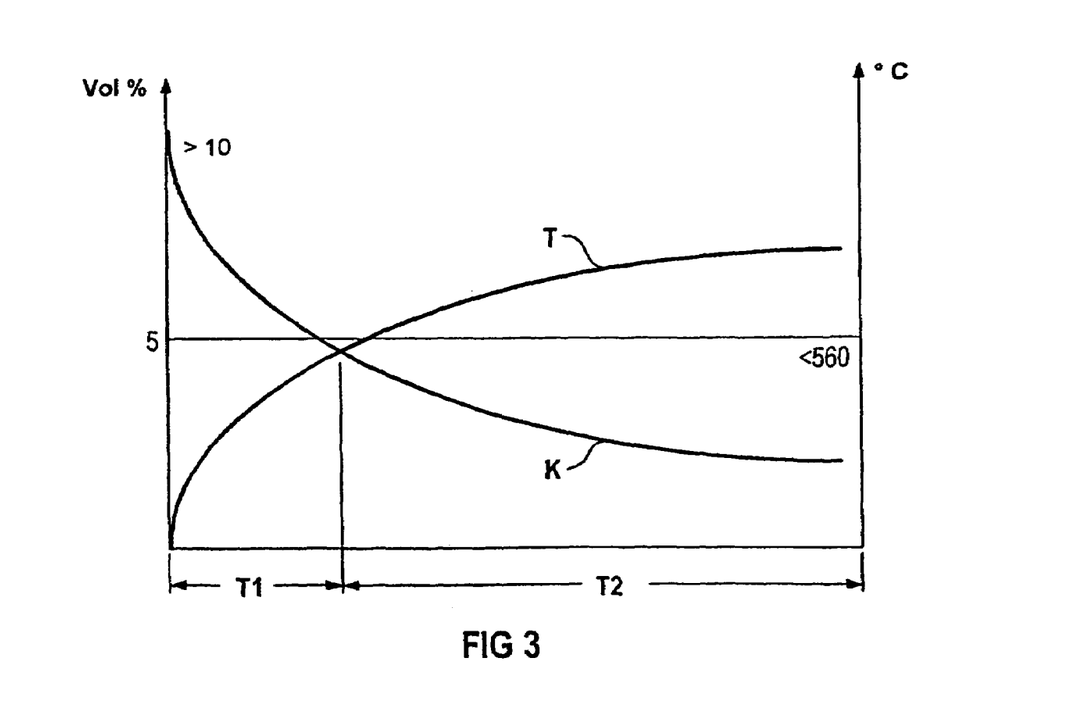
FIG. 3 shows the functional course of the concentration and the reaction temperature in dependence on the flow path along the catalyst system.

FIG. 3 shows the functional progression of the $H_2$ concentration K and the reaction temperature T in dependence on the flow path of the gaseous mixture along the catalyst system 2 for the aforementioned "worst case." During the catalyst system 2 operation, the $H_2$ concentration K in the first sub region T1 is reduced from clearly above 10% by volume to less than 5% by volume through a catalytic oxidation. In the process, the reaction temperature T remains below 560° C. in the first sub region T1, thus falling below the ignition temperature for the reaction gas at the catalyst system 2.

The reaction temperature T increases in the second sub region T2 due to the higher catalytic activity and the ignition temperature of 560° C., in particular, is exceeded. However, since the concentration K in the second sub region T2 is clearly below the ignition concentration of more than 5% by volume, an ignition of the gaseous mixture is securely avoided. The functional sequences shown in FIG. 3 are characteristic for the recombination device 1 according to FIG. 1 as well as for the recombination device 1' according to FIG. 4.

FIG. 4 shows the recombination device 1' for an alternative catalyst system 2. The first sub region T1 and the second sub region T2 in this case are arranged separately. The first sub region T1 comprises a multitude of parallel arranged catalyst bodies 6, which are jointly surrounded by the retarding layer 8. For this, the retarding layer 8 is composed of loose bulk material in which the catalyst bodies 6 are arranged. FIG. 4 shows that in dependence on the type and function of the recombination device 1', several identical first sub regions 1 can be provided in the flow direction of the gaseous mixture, which are arranged parallel to each other, with an intermediate space 22. Alternatively, it is also possible for different sub regions T1, T2 to be arranged alternately.

The second sub region T2 also comprises a multitude of catalyst bodies 6, which are installed downstream of the sub region T1. The catalyst bodies 6 are arranged parallel to each other, as seen in flow direction of the gaseous mixture. Depending on the type and function of the recombination device 1', the catalyst bodies 6 of the first sub region T1 and the second sub region T2 can have the same catalytic activity. However, the catalytic activity of the catalyst bodies 6 can also vary within the first sub region T1 and/or the second sub region T2, owing to the use of different catalytic materials.

On the one hand, the gaseous mixture flows through the two first sub regions T1 for the recombination and reaches the intermediate space 22 with a lower $H_2$ concentration. On the other hand, non-purified gaseous mixture reaches the intermediate space 22 at the same time via a feed-in 24 that is arranged between the two first sub regions T1. The non-purified gaseous mixture is mixed in the intermediate space 22 with the already purified gaseous mixture. As a result, a specific $H_2$ concentration is adjusted on the outflow side of the intermediate space 22, which is preferably below the ignition concentration of 5% by volume. The gaseous mixture flowing out of the intermediate space 22 is then guided in the second sub region T2 along the catalyst body 6 for a further catalytic oxidation.

A grid 26 is arranged in the feed-in 24, which limits the inflow of non-purified gaseous mixture. For example, a wire mesh functions as grid 26. Several wire mesh grids or metal grids can also be installed one after another, thereby making it possible to achieve an especially small gap width of maximum 100 $\mu$m, preferably approximately 2 $\mu$m.

As a result, fine particles such as catalyst poisons and in particular aerosols, are also penetrated quantitatively.

Figure 5:
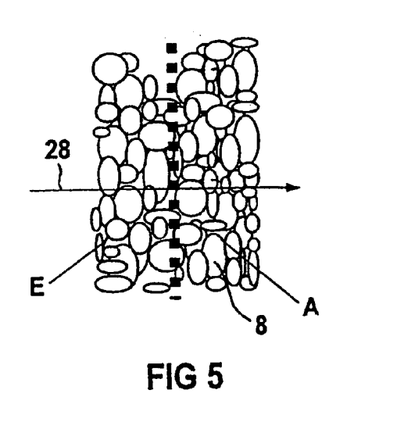
FIG. 5 shows a sectional detail of the first sub region from FIG. 4.

FIG. 5 shows the bulk material for the retarding layer 8 according to FIG. 4. The bulk material retarding layer 8 preferably has a grain size of 1 to 10 mm, in particular of 1 to 5 mm. For this, the retarding layer 8 has a larger grain size in the inflow region E than in the outflow region A, as seen in flow direction of the gaseous mixture (indicated with the arrow 28). As a result, the retarding layer 8 has an especially diffusion-inhibiting and flame-blocking design.

What is claimed is:

1. A recombination device for catalytic recombination of reaction gases in the form of hydrogen and/or carbon monoxide with oxygen in a gaseous mixture, comprising:
   a housing through which the gaseous mixture flows; and
   at least one catalyst system having a first sub region and a second sub region located within said housing;
   said first sub region including:
      a first catalyst body positioned within said housing to receive said gaseous mixture; and
      a retarding layer surrounding said first catalyst body, said retarding layer inhibiting diffusion of the reaction gases; and
   said second sub region including:
      a second catalyst body positioned in the flow direction after said first catalyst body, the reaction gases having direct access to said second catalyst body.

2. The recombination device according to claim 1, wherein said second catalyst body has a higher catalytic activity than said first catalyst body.

3. The recombination device according to claim 1, wherein the second catalyst body comprises a plate-shaped sheet metal carrier coated with a catalyst material.

4. The recombination device according to claim 3, wherein the catalyst material contains a catalytically active precious metal.

5. The recombination device according to claim 4, wherein the precious metal is selected from the group consisting of platinum and palladium.

6. The recombination device according to claim 1, wherein said retarding layer is a porous layer of a bulk material.

7. The recombination device according to claim 1, wherein said retarding layer is deposited as a porous cover layer onto the first catalyst body.

8. The recombination device according to claim 1, wherein a plurality of identical catalyst systems are positioned parallel to each other.

9. The recombination device according to claim 8, wherein the catalyst systems are plate-shaped and positioned less than 20 mm apart, and wherein each catalyst system has a total maximum thickness of 1 cm.

10. The recombination device according to claim 9, wherein the thickness of each catalyst system is 0.3 mm.

11. The recombination device according to claim 1, further comprising an up-current protection device receiving the gaseous mixture before said mixture impinges on said catalyst system, said up-current protection device ensuring a homogeneous recombination.

12. The recombination device according to claim 1, further comprising a down-current protection device positioned after the gaseous mixture traverses said catalyst system, said down-current protection device protecting against a change in flow direction inside the recombination device.

13. The device according to claim 1, further comprising a teflon coating surrounding the retarding layer, said teflon coating preventing adsorption of water generated by the reaction gases within the retarding layer.

14. A method for catalytically recombining reaction gases in the form of hydrogen and/or carbon monoxide with oxygen in a gaseous mixture, comprising the steps of:
   flowing the gaseous mixture through at least one catalyst system including a first sub region and a second sub region in the flow direction of the gaseous mixture, said first sub region having a first catalyst body and a retarding layer surrounding said first catalyst body, and said second sub region having a second catalyst body;
   in said first sub region, catalytically recombining the reaction gases on the first catalyst body, inhibiting diffusion of said gases, and limiting catalytic recombination of said gases to produce a gaseous mixture with a reaction concentration below the ignition concentration;
   flowing said gaseous mixture having a reaction concentration below the ignition concentration into the following second sub region; and
   in said second sub region, catalytically recombining the reaction gases on the second catalyst body, said second catalyst body being directly accessible to the gaseous mixture.

15. The method according to claim 14, further comprising the step of reducing the hydrogen content of the gaseous mixture in the first sub region through oxidation to less than 5% by volume.

16. The method according to claim 14, further comprising the step of guiding the gaseous mixture through the retarding layer.

17. The method according to claim 14, further comprising the step of guiding the entire gaseous mixture along the retarding layer.

18. The method according to claim 14, wherein the reaction temperature in the first sub region is lower than the reaction temperature in the second sub region.

19. The method according to claim 18, wherein the reaction temperature in the first sub region is lower than 560° C.

20. The method according to claim 18, wherein the reaction temperature in the second sub region is higher than 560° C.

* * * * *